United States Patent [19]

Jenkins

[11] Patent Number: 4,946,027
[45] Date of Patent: Aug. 7, 1990

[54] BOOM CONVEYOR

[75] Inventor: John P. Jenkins, Aslockton, United Kingdom

[73] Assignee: Sovex Marshall Limited, Carlton, Great Britain

[21] Appl. No.: 323,132

[22] Filed: Mar. 13, 1989

Related U.S. Application Data

[63] Continuation of Ser. No. 48,828, May 12, 1987, abandoned.

[30] Foreign Application Priority Data

Jan. 9, 1987 [GB] United Kingdom ............... 8700474

[51] Int. Cl.$^5$ .............................................. B65G 15/26
[52] U.S. Cl. ..................................... 198/592; 198/595; 198/812; 198/861.5; 414/393; 414/398; 182/2
[58] Field of Search ............... 198/812, 594, 592, 588, 198/861.5, 302, 595; 193/35 TE; 414/393, 392, 391, 390, 398, 399, 508, 10; 182/2; 212/189, 226; 187/18

[56] References Cited

U.S. PATENT DOCUMENTS

| | | | |
|---|---|---|---|
| 1,790,692 | 2/1931 | Allen | 212/226 |
| 2,927,705 | 3/1960 | Girardi | 414/508 |
| 3,182,827 | 5/1965 | Frost | 414/508 |
| 3,203,503 | 8/1965 | Smith et al. | 182/2 |
| 3,717,263 | 2/1973 | McWilliams | 198/588 X |
| 3,878,957 | 4/1975 | Rempel | 414/508 X |
| 3,885,682 | 5/1975 | McWilliams | 198/594 X |
| 3,888,062 | 6/1975 | Gregord et al. | 414/10 X |
| 3,933,250 | 1/1976 | Roberts et al. | 212/226 X |
| 4,033,463 | 7/1977 | Cervin | 198/812 X |
| 4,073,392 | 2/1978 | Dibler et al. | 414/508 |
| 4,106,634 | 8/1978 | Becker | 414/10 X |
| 4,582,464 | 4/1986 | Bossetti | 414/398 X |

Primary Examiner—Robert J. Spar
Assistant Examiner—Cheryl L. Gastineau
Attorney, Agent, or Firm—Banner, Birch, McKie & Beckett

[57] ABSTRACT

A boom conveyor including a cantilevered conveyor section having an operator's platform at its outer free end is disclosed. The conveyor section is mounted so that in use the outer free end is movable in a vertical plane between predetermined limits. A scissor support is disposed at or adjacent the outer free end and is passively extended by the raising of the free end of the conveyor to provide continual support to the platform. A release valve enables retraction of the support when the free end is lowered.

12 Claims, 2 Drawing Sheets

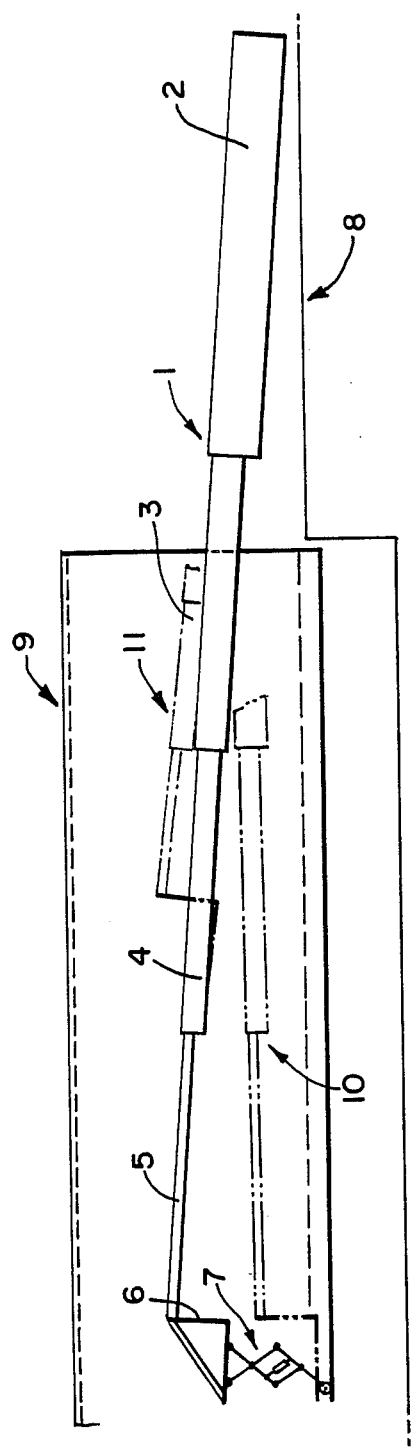

BOOM CONVEYOR

This application is a continuation of application Ser. No. 048,828, filed May 12, 1987 and now abondoned.

BACKGROUND OF THE INVENTION

1. Field of the Invention

This invention relates to boom conveyors and particularly, but not exclusively, to telescopic boom conveyors.

2. Description of Related Art

One application for boom conveyors is the loading and unloading of vehicles at a loading bay of a factory or warehouse. The conveyor has a load supporting belt on which items to be loaded are placed and the conveyor is arranged to project into the vehicle to be loaded. The belt conveyor is typically mounted on a base unit or chassis and it is capable of being raised and lowered and moved from side-to-side, within predetermined limits, to transfer the loads to the point in the vehicle where discharge is required. Small, unbreakable items are usually just allowed to fall off the end of the conveyor, which is manoeuvered around the inside of the vehicle to discharge the loads in a desired manner to fill the vehicle.

With larger breakable items such as televisions, for example, it is necessary for an operator to stand at the end of the conveyor and physically remove the loads from the conveyor and stack them carefully. An operator is also required for certain items, such as tires, which have to be stacked in a nested fashion.

Difficulties arise when loading and unloading large vehicles such as the trailers of modern articulated vehicles which necessitate the use of telescopic boom conveyors having 2,3 or 4 telescopic sections. Because of the height of the trailer body it is necessary for a stacker operating inside the trailer to work above floor level to enable him to remove loads from a conveyor when it is at its highest level and to stack them to the top of the trailer interior.

It has been proposed to mount a platform for the operator at the free end of the conveyor but this is difficult because of the inevitably flexible nature of the telescopic conveyor when it is extended. If the operator moves off-centre from the conveyor, the conveyor would twist and flex causing the platform to be unstable and also risking damage to the conveyor sections themselves. It is not practical to make a telescopic conveyor sufficiently rigid to prevent this movement since it would have to be of a very substantial rigid construction which would inevitably be extremely heavy and expensive to manufacture and, paradoxiacally, more easily damaged than the lighter weight flexible conveyor.

The present invention seeks to provide a boom conveyor having an operator's platform which overcomes the problems outlined above.

SUMMARY OF THE INVENTION

According to the present invention there is provided a boom conveyor including a cantilevered conveyor section having an operator's platform at its outer free end, the conveyor section, in use, being mounted so that the outer free end is movable in a vertical plane between predetermined limits, support means disposed at or adjacent said outer free end being automatically extendible when the said free end is raised to provide continual support to said platform, and release means to enable retraction of the support means in response to the said free end being lowered.

Preferably, the boom conveyor has a plurality of telescopic conveyor sections.

Preferably, the support means includes at least one hydraulic ram and cylinder device.

Preferably, the hydraulic ram and cylinder device has a one-way valve which allows fluid to flow in said device so as to enable the device to extend when the conveyor is raised, the valve being closed in response to fluid flow in a direction to retract the device to thereby lock the device in a fixed position to provide rigid support for the platform.

Preferably, said release means may comprise a release valve or member operable to block hydraulic fluid flow to hold the device in a fixed position to provide rigid support for the platform.

Preferably, said release means may comprise a release valve or member operable to allow hydraulic fluid flow in said device to enable the device to retract.

A preferred embodiment of the present invention will now be described, by way of example only, with reference to the accompanying drawings.

BRIEF DESCRIPTION OF THE DRAWINGS

FIG. 1 illustrates a schematic side view of a telescopic conveyor located within a trailer of a articulated vehicle.

DETAILED DESCRIPTION OF THE PREFERRED EMBODIMENT

Figure 3:
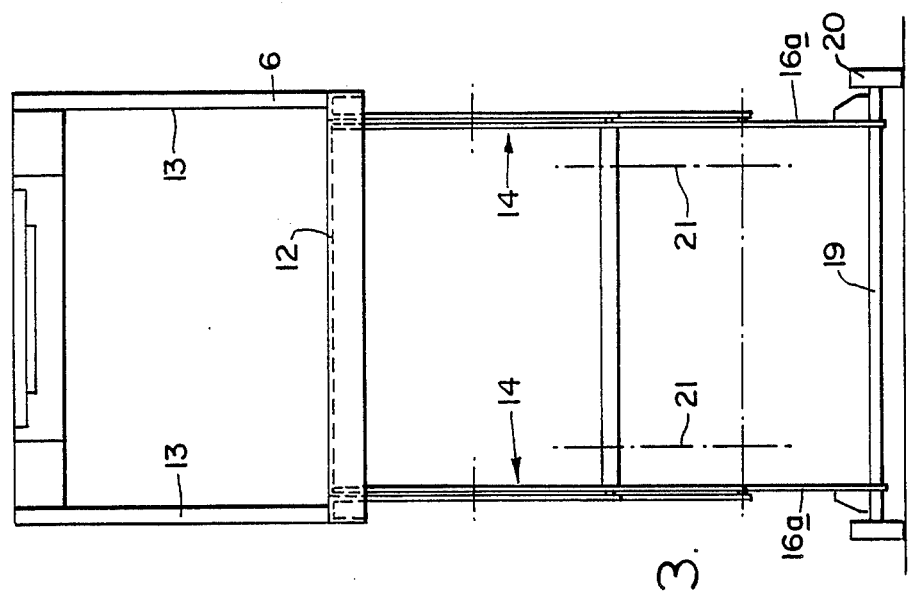
FIG. 3 shows an end view of FIG. 2.

FIG. 1 illustrates schematically, a side view of a telescopic boom conveyor shown generally as reference 1, having a chassis 2 and three extendible conveyor sections 3, 4 and 5. At the free end of the outer-most conveyor section 5 there is an operator's platform 6 supported by support means 7, which is described in greater detail hereinafter.

As illustrated, the conveyor 1 is mounted in a loading bay 8 so as to be capable of projecting inside a trailer 9 of an articulated vehicle backed up to the loading bay 8. The chassis 2 may be secured in the loading bay or may be a wheeled chassis or even a vehicle movable under its own power. The conveyor sections 3,4 and 5 are extendible longitudinally and are also movable in a vertical plane between the limits illustrated at references 10 and 11.

Figure 2:
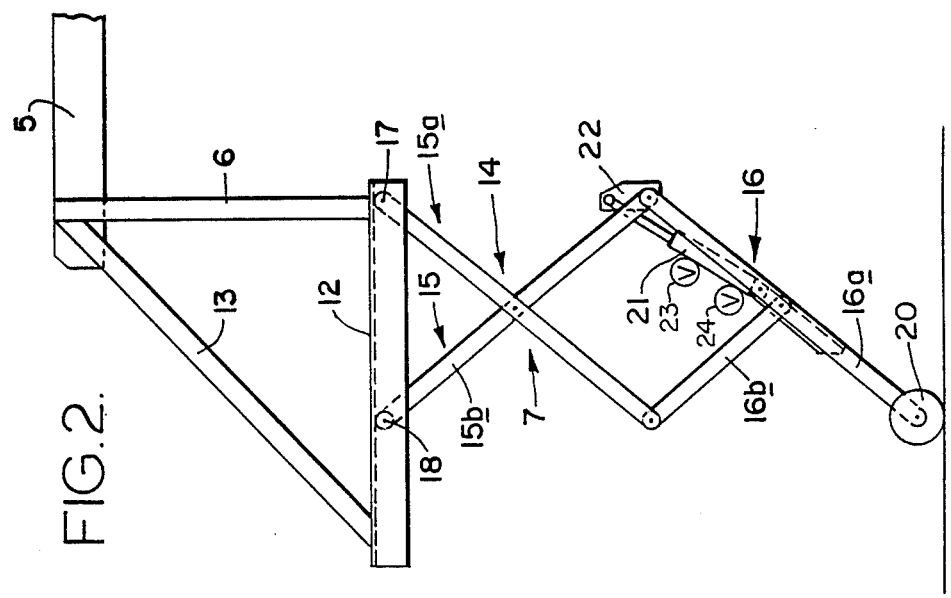
FIG. 2 shows a side view of a platform and support means at the free end of the conveyor.

Referring now to FIGS. 2 and 3, the platform 6 and support means 7 are shown in greater detail. The operator's platform 6 consists of a base 12 mounted at the end of the conveyor section 5 on a structure 13 so that an operator standing on the platform 12 is at the correct working height relative to the surface of the conveyor 5 from which he must remove loads.

The support means 7 comprises two pairs of identical scissors linkages 14, each of which consist of four links arranged in two pairs 15 and 16. The two pairs of linkages are connected by transverse links to form a laterally rigid structure. The upper links, reference 15, are of the same length and are pivotably connected together intermediate their lengths. One link 15a is pivotally secured to the platform 12 by pivot 17 and the other link 15b carries on its upper end a roller 18 which runs in a guide trachk on the underside of the platform 12. At its lower end the link 15b is pivotally connected to a longer limb 16a of the lower linkage 16. The lower end of the link 16a is connected to a shaft 19 carrying a pair of spaced wheels 20 which rest on the floor of the trailer. A short link 16b is connected through pivotal connections between the lower end of the link 15a and the midpoint of the link 16a.

A hydraulic ram and cylinder device 21 extends between the link 16a and the link 15b, the cylinder part of the device being connected so as to pivot about a pivot axis on the link 16a, while the extensible ram of the device is connected through a pivotable connection spaced from the longitudinal axis of link 16a to a link 22 fixed with respect to the link 15b.

The hydraulic ram and cylinder device incorporates in the flow path of the hydraulic fluid therein a one-way valve 24 which automatically allows the device to extend when the platform is raised by the raising of the boom conveyor to which it is connected. The weight of the support means 7 is such that it automatically extends as the conveyor is raised although this action may be assisted by a light spring or pneumatic pressure device to ensure that the platform is always supported by the floor of the trailer.

When the conveyor stops elevating the platform 6, the one-way valve 24 in the hydraulic device will close automatically so that the hydraulic device provides a rigid support for the conveyor platform irrespective of its height. The operator can then move freely from side to side on the platform while he stacks the loads in the trailer.

When the conveyor is lowered, initially, the sections 3 and 4 nearer the chassis 2 are lowered first and the outer most section 5 is supported by the support means 7. This causes some slight degree of movement between the sections 5 and 4, which is present because of the inherent flexibility between the telescopic sections, and this movement is utilised to operate, electrically, a release device 23 in the hydraulic device to enable it to collapse. The release means may comprise a separate by-pass valve to by-pass the aforementioned one-way valve, or may constitute a control member operable to hold the one-way valve open.

The support means with the hydraulic devices thus provides a method for automatically providing a firm support for the load platform irrespective of the height of free end of the conveyor, without any manual operation being required of the operator. Although a hydraulic system is shown, it will be understood that alternative forms of mechanical or electrical support may be used.

I claim:

1. A raisable and lowerable boom conveyor including:
   a chassis means;
   a cantilevered movable conveyor mounted on the chassis means so that the conveyor's outer free end is capable of raising and lowering in a vertical plane between predetermined limits;
   an operator's platform at the outer free end of the conveyor;
   support means for supporting said outer free end located between the outer free end and a support floor and arranged independently of the conveyor, the support means being passively extendable by the raising of the conveyor, passively retractable by the lowering of the conveyor and self-locking, and
   release means for enabling retraction of the support means when the conveyor is lowered.

2. A raisable and lowerable boom conveyor including:
   a movable conveyor, wherein the conveyor's outer free end is capable of raising and lowering in a vertical plane between predetermined limits;
   an operator's platform at the outer free end of the conveyor;
   support means for supporting said outer free end located between the outer free end and a support floor and arranged independently of the conveyor, the support means being passively extendable by the raising of the conveyor, passively retractable by the lowering of the conveyor and self-locking; and
   release means for enabling retraction of the support means when the conveyor is lowered.

3. A boom conveyor according to claim 2, wherein the support means includes at least one hydraulic ram and cylinder device.

4. A boom conveyor according to claim 3, wherein the hydraulic ram and cylinder device includes a one-way valve allowing fluid flow in said cylinder device to enable the cylinder device to extend when the conveyor is raised; and to close the one-way valve in response to fluid flow in a retraction direction of the cylinder device thereby locking the device in a fixed position to support the platform.

5. A boom conveyor according to claim 4, wherein the release means comprises a release valve.

6. A boom conveyor according to claim 4, wherein the release means comprises means operable to open said one-way valve to allow hydraulic fluid flow in the ram and cylinder device thereby enabling the device to retract.

7. A boom conveyor according to claim 6, wherein the support means further includes two laterally spaced identical scissor linkages; and transverse links which connect the linkages to form a laterally rigid structure.

8. A boom conveyor according to claim 7, wherein each scissor linkage includes four links arranged in two pairs, one pair comprising upper links, the other pair comprising lower links, the said upper links are of the same length and pivotally connected intermediate their lengths, one of the said upper links being pivotally secured to the said platform, the other of the said upper links travelling on the underside of the platform.

9. A boom conveyor according to claim 8, wherein one of the lower links is pivotally connected to a longer limb of the other lower link, the said longer limb being connected to a shaft carrying a pair of spaced wheels.

10. A boom conveyor according to claim 8, wherein the hydraulic ram and cylinder device extends between two links of the identical scissor linkages.

11. A boom conveyor according to claims 1, 2, 3, 4, or 7, wherein the conveyor includes a plurality of telescopic sections.

12. A boom conveyor according to claims 1, 2, or 4, wherein the support means further includes two laterally spaced identical scissor linkages; and transverse links which connect the linkages to form a laterally rigid structure.

* * * * *